Sept. 19, 1967     E. J. BATORSKI ETAL     3,342,106

HOBBING MACHINE

Filed Oct. 18, 1965            6 Sheets-Sheet 1

INVENTORS
Edward J. Batorski
Rudolf P. Hundt

BY DeLio and Montgomery
ATTORNEYS

Sept. 19, 1967   E. J. BATORSKI ETAL   3,342,106
HOBBING MACHINE
Filed Oct. 18, 1965   6 Sheets-Sheet 2

INVENTORS
Edward J. Batorski
Rudolf P. Hundt
BY
De Lio and Montgomery
ATTORNEYS

Sept. 19, 1967  E. J. BATORSKI ETAL  3,342,106
HOBBING MACHINE

Filed Oct. 18, 1965  6 Sheets-Sheet 3

INVENTORS
Edward J. Batorski
Rudolf P. Hundt

DeLio and Montgomery
ATTORNEYS

Sept. 19, 1967  E. J. BATORSKI ETAL  3,342,106
HOBBING MACHINE

Filed Oct. 18, 1965  6 Sheets-Sheet 4

INVENTORS
Edward J. Batorski
Rudolf P. Hundt
BY De Lio and Montgomery
ATTORNEYS

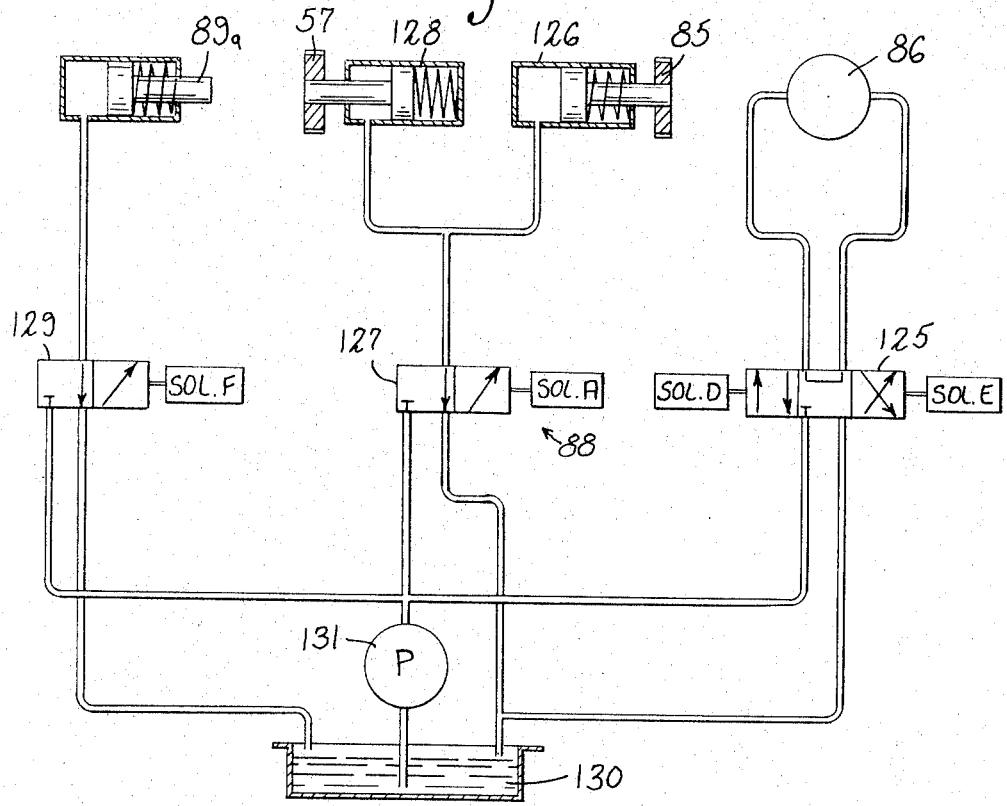
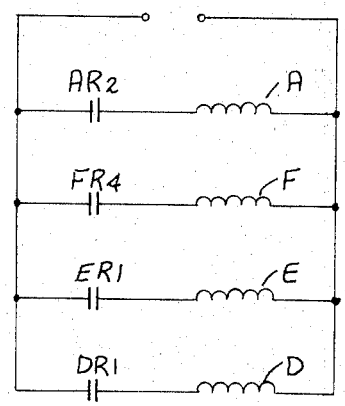

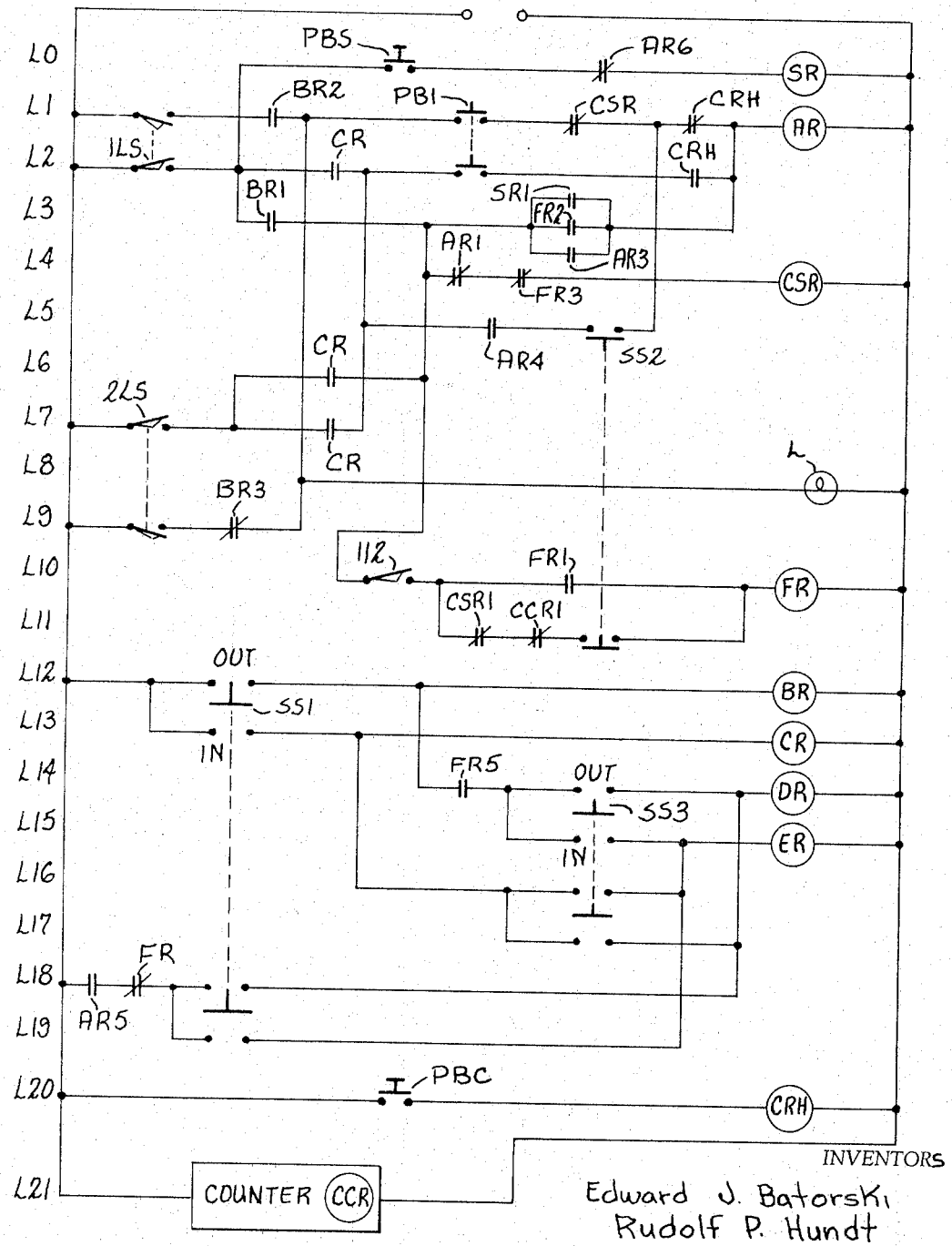

United States Patent Office 3,342,106
Patented Sept. 19, 1967

3,342,106
HOBBING MACHINE
Edward J. Batorski, Wallingford, and Rudolf P. Hundt, Cheshire, Conn., assignors to Textron Inc., Providence, R.I., a corporation of Rhode Island
Filed Oct. 18, 1965, Ser. No. 497,338
27 Claims. (Cl. 90—4)

ABSTRACT OF THE DISCLOSURE

This application discloses a hobbing machine in which the hob arbor may be continuously or intermittently advanced or have the arbor operated on a continuous shifting mode with intermittent shifting superimposed. The hob arbor is arranged to be axially shifted by means of a screw shaft coaxial therewith. The screw shaft may be received within a threaded member which has relative rotation therewith so that upon such relative rotation the screw shaft and the hob arbor move axially. The hob arbor is rotated through a gear train including a pair of clutchable pinions. The ratio of such gear train is so selected that when the pinions are clutched relative motion exists between the screw shaft and said threaded member to impart continuous linear motion to the hob arbor. If the pinions are declutched a second drive means is effective to drive the shifting member independent of the rotation of the arbor.

This invention relates to hobbing machines, and more particularly relates to a hobbing machine having means for both intermittently and continuously shifting the hob head.

In the operation of hobbing machines of the type which are axially fed, the hob may be intermittently advanced tangentially of the work spindle after a number of blanks have been cut in order to bring a new section of the hob into a cutting position. This intermittent type of feeding or shifting of the hob has the disadvantage of the hob wearing in steps, and not evenly along its length. Such shifting does not make full use of the hob since the portions of the hob between successive settings perform very little, if any, cutting and therefore the wear along the length of the hob is not uniformly distributed. However, with the intermittent shifting hob an advantage is presented in that the hob can be manually set to a new position and, further, gear ratios in the hob drive do not become critical.

Hobbing machines also are used in which the hob is continuously shifted. This continuous shifting is advantageous in that it keeps the hob shifting at a continuous rate as it cuts so that it does not wear excessively at any one point or location thereof and, further, such shifting is done automatically. The known continuous shifting mechanisms do present disadvantages, however, in that the feed rate is limited by the gear ratios which may adversely affect the wear of the hob. For example, if the material being cut is quite hard and the feed rate is too low, the hob will wear quite rapidly. Conversely, if the material is too soft for the hob, the hob will not wear properly along its length in relation to the work being done.

In view of these known deficiencies and limitations in existing hobbing machines, the present invention provides a hobbing machine which includes new and improved apparatus for combining both intermittent and continuous shifting of the hob to provide the desirable features of both and minimize the disadvantages thereof. A hobbing machine embodying the invention may have the hob shifted continuously or intermittently through shifting drive means operated independently of the hob arbor drive. Further, a hobbing machine embodying the invention may be operated in a continuous shifting mode with intermittent shifting superimposed.

Accordingly, an object of this invention is to provide a new and improved hobbing machine which may be both continuously and intermittently shifted.

Another object of this invention is to provide a hobbing machine having new and improved means for continuously shifting the hob.

Another object of this invention is to provide a hobbing machine having new and improved drive and control means for intermittently shifting the hob a predetermined amount after predetermined intervals of time.

Another object of this invention is to provide a hobbing machine having new and improved means for predetermining the amount of hob shift during intermittent shifting operation.

A further object of this invention is to provide a hobbing machine having new and improved hob head drive and coupling means for effecting either a continuous or intermittent shifting mode of operation.

A further object of this invention is to provide a new and improved hob head including a new and improved gear arrangement for driving the hob shifting member either from the main arbor drive or from an independent shifting drive.

A still further object of this invention is to provide a hob head having new and improved means for clutching a hob shifting drive to the shifting member for predetermined times to effect a predetermined shift of the hob.

The features of the invention which are believed to be novel are set forth with particularity and distinctly claimed in the concluding portion of this specification. However, the invention both as to organization and operation, together with further objects and advantages thereof, may best be appreciated by reference to the following detailed description taken in conjunction with the drawings, in which:

FIG. 8 is a diagram, partly schematic and partly diagrammatic, showing a typical hydraulic system that is used in conjunction with a hob head embodying the invention;

FIG. 9 is a schematic diagram of an electrical control circuit; and

FIG. 10 is a schematic diagram of a solenoid actuating circuit operated through the circuit of FIG. 9.

Figure 1:
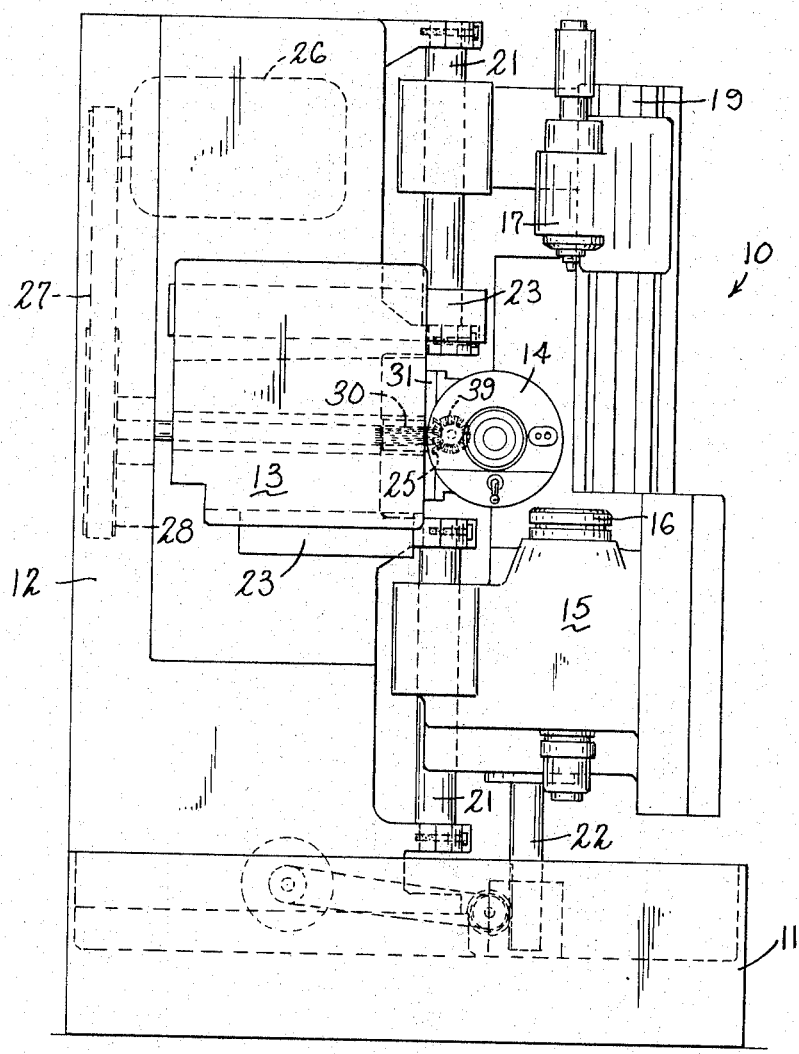
FIG. 1 is an elevation of a hobbing machine utilizing a hob head embodying the invention.

The hobby machine 10, FIG. 1, generally comprises a base member 11, a massive column 12 extending vertically therefrom. Horizontally movable on column 12 is a hob slide 13 having a hob head 14 mounted thereon. Vertically movable wtih respect to column 12 is a worktable 15 which includes a chuck 16 and a footstock 17 movable vertically on column portion 19 of worktable 15. A workpiece, not shown, is adapted to be received in chuck 16 and engaged by footstock 17 and held in a position to be acted upon by hob head 14. Worktable 15 is vertically movable with respect to column 12 on ways 21 of circular cross section by means of a lead screw 22. Hob slide 13 is movable with respect to column 12 on ways 23 toward and away from the axis of chuck 16 and footstock 17. Power is delivered to the hob head by means of a shaft 24 which is splined in the hub of a bevel gear 25 extending into hob head 14. Shaft 24 is driven from a motor 26 through a belt 27 and pulley 28. The splined arrangement is to permit movement of shaft 24 with respect to gear 25 as the slide and hob head 14 thereon are moved toward and away from the axis of the chuck 16. For a more detailed description of the structure of the hobbing machine shown in FIG. 1, reference may be had to co-pending application, Serial No. 497,278 (De Lio and Montgomery Docket No. 8158) filed on the same date as this application and assigned to the same assignee.

Drive shaft 24 extends through the hub of bevel gear 25 which is internally splined to mate with the splines 30 of shaft 24. The hob head 14 may be rotated on the face of slide 13 with respect to slide 13 by means of its attachment to collar 31 (shown in dotted line) having therein an annular T-shaped channel 32 adapted to receive fastening bolts, not shown, therein.

Hob head 14 may thus be moved towards and away from the axis of chuck 16 and footstock 17 on slide 13 and may be rotated on the face of slide 13 to develop a predetermined cutting angle with respect to a workpiece. The chuck and spindle are driven at a rate which is in timed relation to the hob head by suitable timing gears, not shown.

Hob head 14 comprises a housing 34 which carries a member 35 rotatably supporting therein the hub of bevel gear 25. Mounted in frame 34 is a drive shaft 36 rotatably supported at either end thereof by bearing assemblies 37 and 38. Drive shaft 36 carries a bevel gear 39 meshing with bevel gear 25 to supply driving torque to shaft 36. Mounted to the other end of drive shaft 36 is a drive pinion 40. Drive pinion 40 engages driven hob arbor gear 42 which carriers thereon a flywheel 43. A sleeve-like hub 44 of gear 42 is splined to hob arbor 45 as at 46. With this arrangement hob arbor 45 rotates with gear 42 and also may move axially with respect to gear 42. Gear 42 is also connected as by bolts 47 to a sleeve 48 which is rotatably supported within frame 34 by bearing means 49 and 50.

Hob arbor 45 is supported in sleeve 48, housing portion 34a, and mounts a hob 51 thereon between its supporting areas. Flywheel 43 is mounted on gear 42 by means of bolts 43a and further connected as by means of pins 52 to a gear 53. Gear 53 is rotatable about a sleeve-like member 54, at the same rotational speeds as gear 42 and flywheel 43. Sleeve 54 is rotatably mounted on the hub 44 of gear 42 by means of bearing assemblies 55 and may rotate relative to gear 42 and hob arbor 45. Gear 53 engages a pinion 56 which is clutchable to a second pinion 57. Both pinions form part of a clutch assembly 58 carried in housing 34. Pinions 56 and 57 are serrated on their adjoining sides and may be manually moved into clutching engagement by means of a pivotal cam 59, or hydraulically actuated, as hereinafter described.

Pinion 57 is in meshing engagement with a gear 60 which is keyed to sleeve 54 as at 69 for rotation therewith. When pinions 56 and 57 are clutched together gear 53, through pinions 56 and 57, drives gear 60 and, therefore, sleeve 54. If number N of the teeth of gears 53, 60 and pinions 56, 57 are so selected that $$\frac{N_{52}}{N_{56}} \times \frac{N_{57}}{N_{60}} > 1$$

when pinions 56 and 57 are clutched together sleeve 54 rotates at a greater speed than hob arbor 45. Such relative rotation would produce axial movement of the hob arbor.

A member having a threaded bore such as nut 62 is nonrotatably secured to sleeve 54 coaxial therewith as by pin 63. Threadably received in nut 62 is a screw shaft 64 which is keyed at 65 to hob arbor 45. As thus far described, when drive shaft 36 is driven it drives pinion 40 which, in turn, drives gear 42. This, in turn, produces rotation of hob arbor 45 through spline 46, and also sleeve 48 in bearing assemblies 49 and 50. As flywheel 44 is rotated it drives gear 53 which, in turn, drives gear 60, through clutched pinions 56 and 57. Sleeve 54 and nut 62 rotate at a higher speed than hob arbor 45. As a result, screw shaft 64 must advance through nut 62 by virtue of the connection of screw shaft to hob arbor by key 65 and bolt 67. Screw shaft 64 shifts hob arbor 45 to the left, as viewed in FIG. 3. This shifting of hob arbor 45 with hob 51 thereon is continuous so long as power is supplied to drive pinion 40 and pinions 56 and 57 are clutched.

Nut 62 is held against axial movement in the cup-shaped end of sleeve 54 by a second sleeve 68 secured to sleeve 54 by means of bolts 69. Mounted to the opposite end of sleeve 68 is a plate 70.

Another sleeve 72 is disposed within sleeve 68 having an inwardly directed flange 73 at one end thereof. Secured to the end of screw shaft 64 adjacent plate 70 is a plate 74. Flange 73 and plate 74 are arranged to signify the limits of shifting of hob arbor 45.

A shift limit control ring 75 is disposed about sleeve 68, and positioned thereon by biased plungers 76 and 77. Ring 75 carries inwardly directed plates or fingers 78 which are acted upon by plungers 76 and 77 to position ring 75. When the hob arbor is shifted out and screw shaft 64 moves to the left, as viewed in FIG. 3, plate 74 will engage flange 73 and move ring 75 to the left. Conversely, when the hob arbor is shifted to the right, plate 74 will engage retaining ring 79 and move sleeve 72 and limit control ring 75 to the right, as viewed in FIG. 3.

Limit control ring 75 when moved by fingers 78 is effective to move plungers 80 or 81 (FIG. 4) against the bias of associated springs 82 and 83, respectively. Plungers 80 and 81 operate limit switches, hereinafter described.

Figure 3:
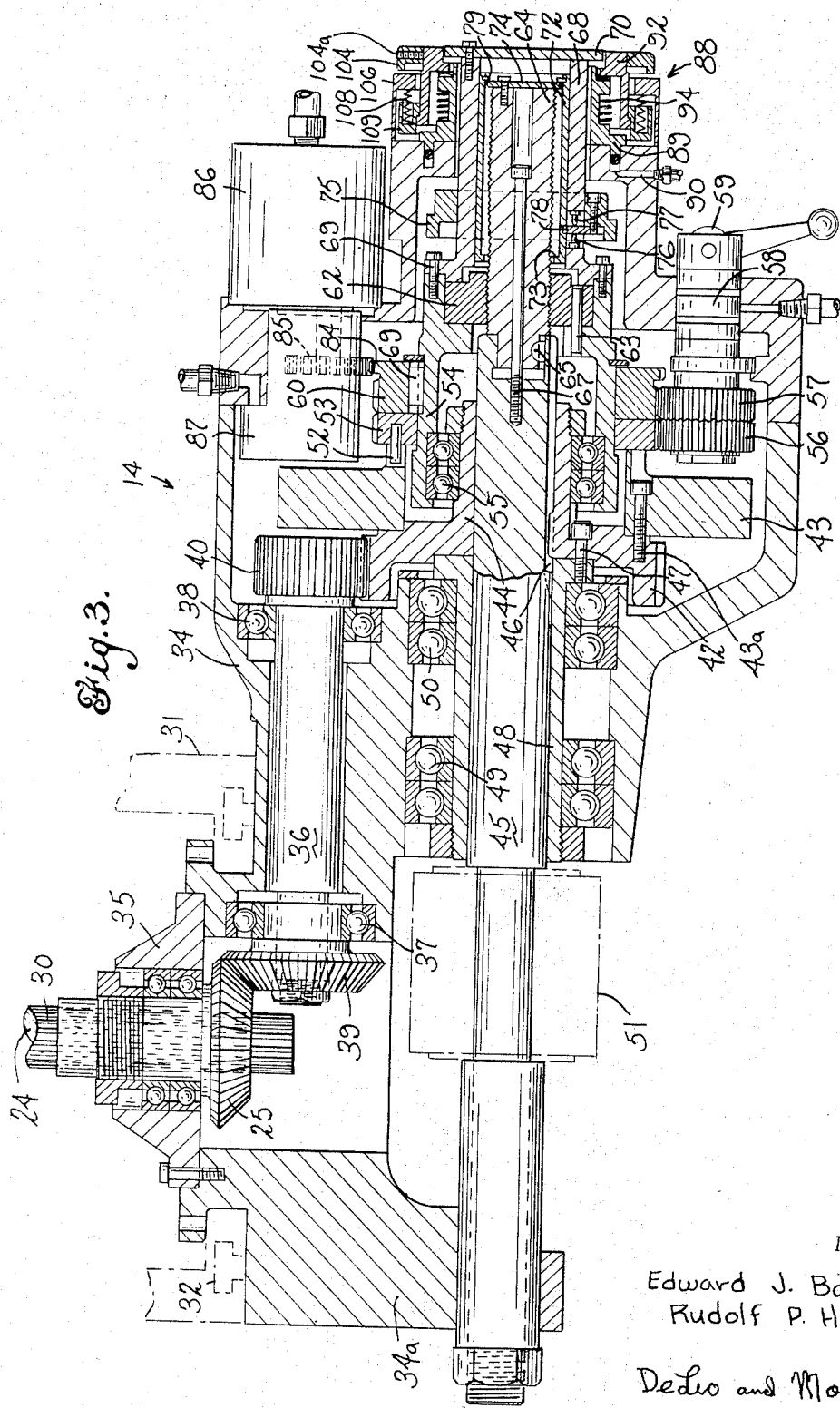
FIG. 3 is a view in section taken along lines 3—3 of FIG. 2.
Figure 5:
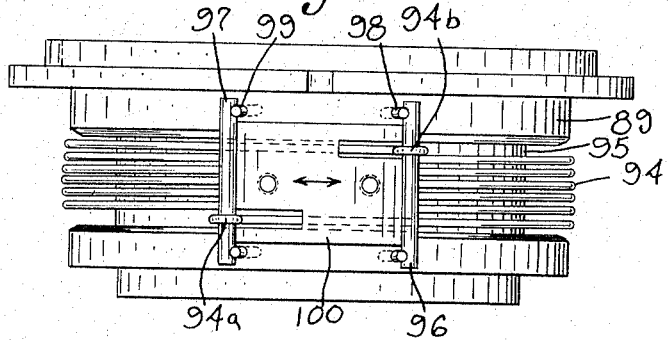
FIG. 5 is a plan view of a clutching assembly utilized during intermittent shifting operation of the hob.
Figure 6:
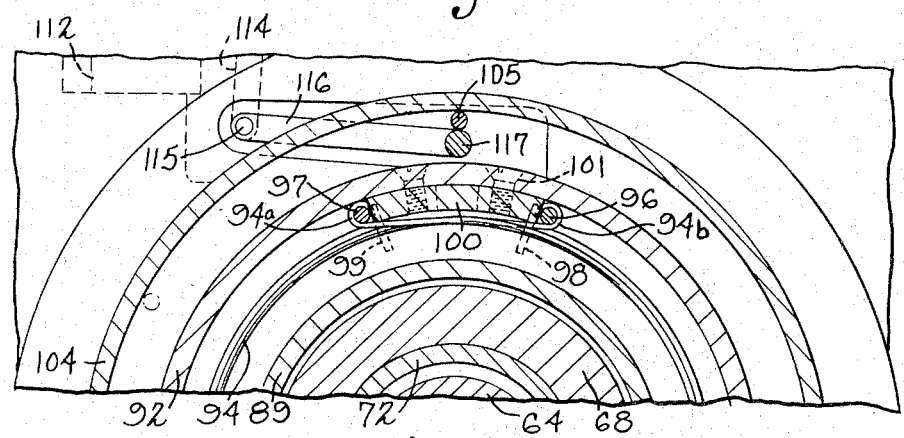
FIG. 6 is a view taken along lines 6—6 of FIG. 4.

The hob head as thus far described is a continuous shifting hob head, wherein the hob is shifted continuously from right to left as viewed in FIG. 3, so long as pinions 56 and 57 are clutched.

In accordance with one aspect of the invention, the hob head is also arranged to be shifted by a second drive means. Gear 60 is provided with a second set of gear teeth 84, or alternatively, another gear might be coupled thereto. Gear teeth 84 are engaged by a pinion 85 driven by a reversible motor 86, preferably of the hydraulic type. Pinion 85 may be clutched to and declutched from the shaft of motor 86 by clutch 87, as will hereinafter be explained. Pinion 85 drives gear 60 through teeth 84 and sleeve 54 and nut 62 at a speed of rotation different from that of hob arbor 45 and thus produces axial motion of screw shaft 64 in nut 62 with resultant axial shifting of the hob arbor. During the intermittent shifting mode of operation, a predetermined shift may be set to occur during predetermined intervals of time or in response to hobbing operations on a predetermined number of workpieces.

A clutching assembly 88 for producing intermittent shifting is carried by housing 34 and generally comprises a piston 89 adapted to be actuated by hydraulic fluid applied thereto through port 90. When actuated, piston 89 applies a frictional load through a thrust bearing 91 to a clutch drum 92 and plate 70. This clamps piston 89, clutch drum and end plate 70 together. Disposed and carried on clutch drum 92 is a dial ring 93 having a scale thereon which indicates the degree of shifting that is to be predetermined and the direction thereof during intermittent shifting. Sleeve 68 together with end plate 70 form a first clutch member, which together with clutch drum 92, provide a clutch actuated by piston 89.

Figure 4:
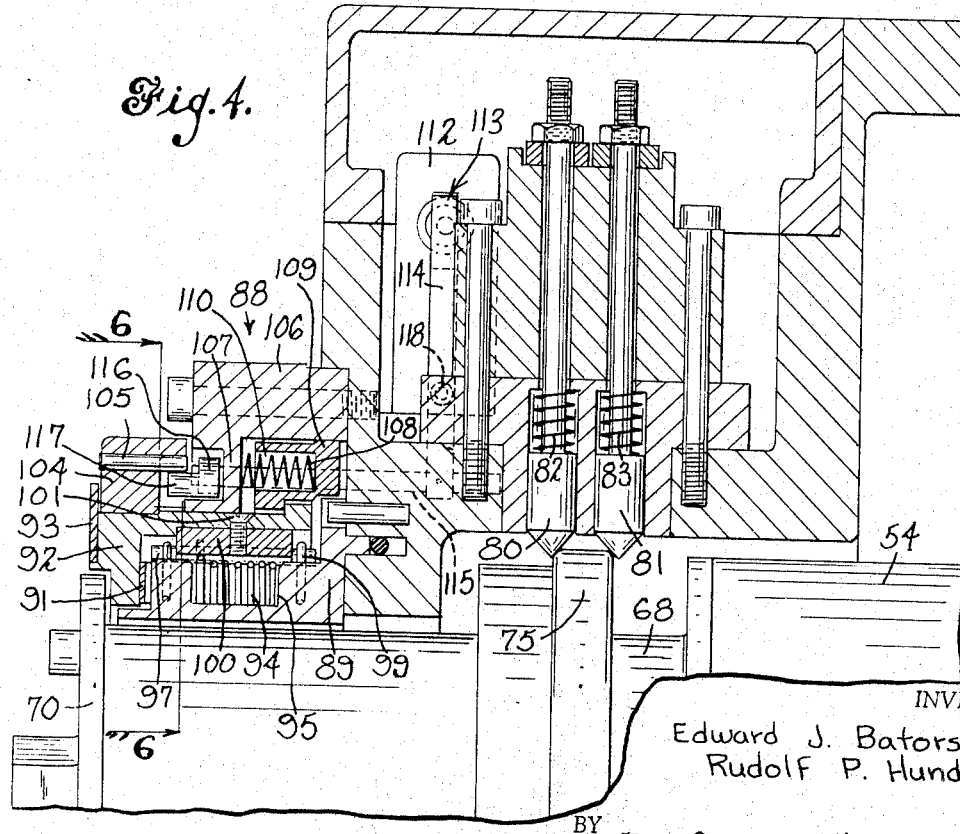
FIG. 4 is a view in section seen in the plane of lines 4—4 of FIG. 2.

A helical spring 94 is disposed about piston 89 in recess 95 provided therein, as more clearly seen in FIG. 4. The ends 94a and 94b of spring 94 are fastened to rods 96 and 97 which are held against the tension of the spring by posts 98 and 99, respectively. A plate 100 secured to clutch drum 92 by bolts 101 is disposed between rods 96 and 97. Plate 100, upon rotation of clutch drum 92, moves one of rods 96 or 97 to tension spring 94. A collar 104 which acts as an indicator is angularly positionable on clutch drum 92 by means of a set screw 104a to place a switch-actuating stud 105 carried thereby in a predetermined position, as exemplified in FIG. 7. Collar 104 which functions as a shift predetermining element cooperates with dial ring 93 as hereinafter described.

An annular member 106 mounted to housing 34 has a radially inwardly directed flange portion 107 which provides a reaction surface for springs 108 to act on an annular clutch drum and piston return member 109 which functions to return clutch drum 92 and piston 89 when hydraulic pressure on piston 89 is removed. Member 109 is provided with a plurality of pockets 110 receiving springs 108 therein.

Figure 2:
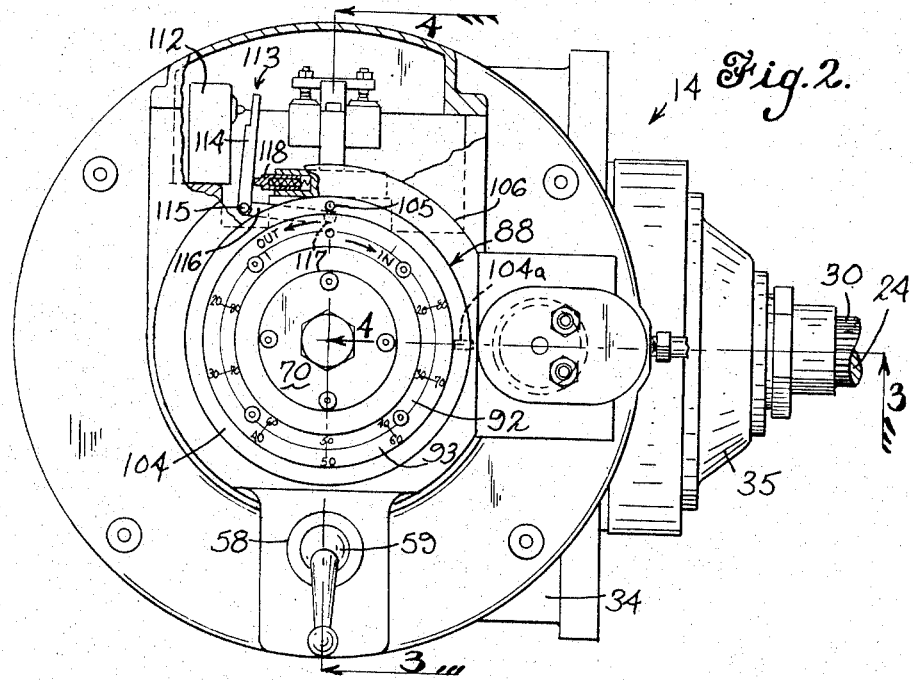
FIG. 2 is an enlarged view of the hob head shown in FIG. 1, but reversed with respect to FIG. 1.

Stud 105 is arranged to actuate a shift limit switch 112 through a pivotal lever 113 making a contact arm 114, a rotatable shaft portion 115, an actuating arm 116 and a camming finger 117 arranged to be engaged by stud 105 to move contact arm 114 from switch 112. A spring biased plunger 118 (FIG. 2) urges arm 114 toward switch 112. Shaft portion 115 is rotatably mounted in member 106.

Assume now that the hob head is to be operated in an intermittent shifting mode to shift OUT (to the left in FIG. 3). Collar 104 is rotated on clutch drum 92 and set thereon for a predetermined shift. Pinions 56 and 57 are declutched and pinion 85 is clutched to motor 86 to drive gear 60 through teeth 84. Hydraulic fluid is applied through port 90 to actuate piston 89 and frictionally lock clutch drum 92 to plate 70, which makes plate 70 rotate with nut 62.

Figure 7:
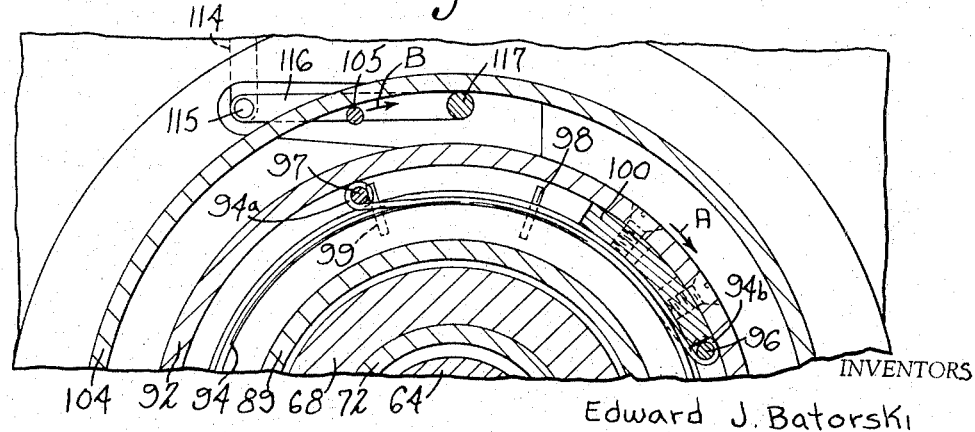
FIG. 7 is also a view taken along lines 6—6 of FIG. 4, but during a different portion of an operative cycle.

As clutch drum 92 is rotated clockwise as indicated by Arrow A, FIG. 7, stud 105, on collar 104 which is fastened to clutch drum 92, rotates also as indicated by arrow B. When stud 105 engages finger 117, contact arm 114 opens switch 112 to indicate that the shift predetermined by the position of collar 104 has been made. Switch 112, as hereinafter described, then interrupts further shifting.

FIG. 8 schematically and diagrammatically illustrates a hydraulic circuit which controls the operation of motor clutch 87, clutch assembly 58 for pinions 56, 57 and the dial cylinder clutch. The motor 86 is a hydraulic motor which may be operated in either direction under the control of a four-way valve 125 controlled by solenoids D and E. The hydraulic motor clutch 87 is operated by a cylinder 126 under control of a four-way valve 127 operated between its two positions by solenoid A. When solenoid A is energized, the piston of cylinder 126 operates to clutch pinion 85 to the shaft of motor 86. Also operated by valve 127 is a hydraulic cylinder 128 which declutches pinion 57 from pinion 56 when solenoid A is energized. In FIG. 8 the hydraulic arrangement for actuating piston 89 is represented by the cylinder and piston 89a. The piston 89 is energized to move to the right when solenoid F is energized and hydraulic fluid is introduced through valve 129 into port 90 (FIG. 3). Hydraulic fluid is drawn from a source 130 by a pump 131 and applied under pressure thereby to the various cylinders.

FIG. 9 schematically illustrates the control circuitry for operating the hob head and FIG. 10 is a schematic diagram of the coils of solenoids A, D, E, and F. In FIG. 9, relay coils and their controlled contacts are identified by similar reference characters. Solenoid A is energized through a contact of relay AR, solenoid D is energized through a contact of relay DR, solenoid E is energized through contact of relay ER, and solenoid F is energized through contact of relay FR. Assume now that the aforementioned expression for the ratio of gears 53, 60 and pinions 56 and 57 is one, and the hob head is to be operated in the intermittent shifting mode. Selector switch SS1 is set in an OUT position indicating that the hob is to shift to the left as viewed in FIG. 2 and intermittent shift selector switch SS2 is closed. Selector switch SS3 is also set in the OUT position. Relay BR is energized through selector switch SS1 and picks up its contact BR1, line L3, and allows cycle start relay CSR to become energized after a short time delay. When BR1 closes, it also energizes relay FR through line L11 which picks up its contact FR1 and latches itself in before contact CSR1 opens. Relay FR then closes its contact FR2 in line L3 and energizes relay AR. Both relays FR and AR drop out their contacts FR3 and AR1 in line L4 and deenergize relay CSR and CSR1 closes. When relay AR is energized it picks up its contact AR2 in circuit with solenoid coil A and solenoid A then operates valve 127 to actuate cylinder 128 to declutch gears 56 and 57 and further operates cylinder 126 to actuate clutch 87 and connect motor 80 to pinion 85. Relay FR closes its contact FR4 in circuit with solenoid F (FIG. 10) which actuates valve 129 and supplies hydraulic fluid through port 90 to piston 89. Piston 89 then acting through thrust bearing 91 clamps clutch drum 92 to end plate 70. Contact FR5 energizes relay DR, line L14, which in turn closes its contact DR1 to energize solenoid E. Solenoid E then operates valve 125 to permit hydraulic fluid to be delivered to motor 86 to rotate it in a clockwise direction. Hydraulic motor 80, which is the hob shift motor, will now through pinion 85 and teeth 84 on gear 60 drive nut 62 in a clockwise direction and clutch drum 92 will rotate therewith until stud 105 rides over finger 117 to open switch 112. This will open the circuit to relay FR causing deenergization thereof. Relay FR then drops out its normally open contacts which deenergizes relays AR and ER.

When relay AR is deenergized, solenoid A is deenergized, pinions 56 and 57 are clutched together by the return spring 128a in cylinder 128. Also, cylinder 126, by return spring 126a, disconnects pinion 85 from motor 80 in clutch 86. At this time all solenoids are deenergized, and hob arbor 45 with hob 51 is rotated by hob drive gear 42 without shifting. When relay FR was deenergized it deenergized solenoid F, dumping cylinder 130. Springs 108 then return clutch drum 92 and piston 89 (FIG. 4) to a declutched position, and spring 94 resets clutch drum 92 and dial 93 to its set position.

Now, after a given interval of time as may be predetermined by a number of workpieces that have been cut as determined by a counter 140, another shift is initiated. Counter 140 is of a type which may be termed a down counter and may be set to count down from a predetermined number and actuate an electrical circuit. Such counters are well known and may be made responsive to various stimuli such as the number of workpieces placed in chuck 16, and may further include automatic resetting means. When counter 140 counts down to zero and is reset, a circuit exemplified as relay CRR is energized and picks up its contact CCR1 in line L11 to energize relay FR. This will initiate another shift of a magnitude predetermined by the setting of collar 104 which through stud 105 will again open switch 112 after a predetermined interval of time and again deenergize relay FR, for a given interval of time. This sequence then repeats itself each time the counter counts out a predetermined number of workpieces. It will be apparent that the counter may be set for any number of workpieces and may count such workpieces by the number of movements of the worktable, the hob slide, the number of revolutions of the workholding chuck or any suitable indicia. It may thus be seen that the hob head is arranged to be automatically intermittently shifted along its length of travel.

In the circuit of FIG. 9 it will be apparent that the direction of hob shift that is IN or OUT may be determined by the energization of relays BR or CR selectively, and likewise the direction of rotation of motor 80 is determined by which of relays DR or ER is energized.

To continuously shift the hob, say, from an IN to an OUT position, selector switch SS1 is placed in the OUT position which energizes relay B and closes all BR contacts. Intermittent shift ON-OFF SS2 switch is opened, and selector switch SS3 is left open.

Now, when continuous shift switch PBS, line L0, is closed, shift relay SR is energized through 1LS, line L2, and picks up its contact SR1 in line L3 to energize relay AR. Simultaneously, relay CSR in line L1 is energized and its contact CSR1 locks out intermittent shift relay FR. Relay AR picks up its contact AR3 in line L3 to lock itself in and opens contact AR6 to deenergize relay SR. Relay AR further picks up its contact AR5, line L18, to energize relay DR. Relay DR through its contact DR1, FIG. 10, energizes solenoid D. Valve 125 admits fluid to motor 86 to produce clockwise rotation thereof and slow relative rotation between nut 62 and arbor 45. Hob 51 will then shift right-to-left as viewed in FIG. 2.

When hob 51 has shifted completely OUT, limit switch 1LS is operated by plunger 81 and limit control ring 75. Switch 1LS, line L2 opens and relay AR is deenergized. To rapidly return the hob to the IN position, selector switch SS1 is moved to the IN position, and rapid return switch PB1 is closed. Relay AR is then energized through the closed section of switch 1LS, and pinions 56 and 57 are declutched, and pinion 85 clutched to motor 80. Also, contact AR5 in line L18 is picked up and energizes relay ER through line L19 to produce rotation of motor 80 in a counterclockwise direction. This produces a large negative relative rotational speed between nut 62 and arbor 45, and hob 51 rapidly shifts to an IN position to begin another cutting cycle. Lamp L, line L8, is energized when either of limit switches 1LS or 2LS is operated. When the normally open side of switch 2LS is closed, and the normally closed side opened to deenergize relay AR, solenoid A is deenergized and declutches pinion 85 from motor 80. The apparatus is now ready to shift OUT again.

The hob may also be positioned anywhere between 1LS and 2LS by closing switch PBC, to energize relay CRH, place selector switches SS1 in proper position for desired direction of shift and close switch PB1 to energize relay AR and solenoid A.

To obtain a combination shift, that is, both continuous and intermittent, the gears 53 and 60 must have other than a 1:1 gear ratio (assuming pinions 56 and 57 are the same), and intermittent selector switch SS1 must be ON. During continuous shifting, shift is obtained through gears 53, 60 and pinions 56, 57. Intermittent shifting is obtained through relay F, solenoid FR together with piston 89, clutch 92 and end plate 70, as previously described. With this arrangement, ability is presented to add to or subtract from continuous shift.

It may thus be seen that the objects of the invention set forth above as well as those made apparent from the preceding description are efficiently attained. While preferred embodiments of the invention have been set forth for purposes of disclosure, other embodiments of the invention as well as modifications to the disclosed embodiments thereof may occur to those skilled in the art. Accordingly, the appended claims are intended to cover all embodiments of the invention and modifications thereof which do not depart from the spirit and scope of the invention.

What is claimed is:

1. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said hob arbor and said shifting member, and second drive means for rotating said shifting member relative to said arbor.

2. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, second drive means independent of said first drive means for rotating said member relative to said arbor and means for periodically connecting said second drive means to said shifting member.

3. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for moving said arbor axially upon relative rotation between said arbor and said shifting member, second drive means independent of said first drive means connectable to said shifting member for rotating said shifting member relative to said arbor, and means for intermittently connecting said second drive means to said shifting member.

4. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, means for connecting said first drive means to said shifting member to prevent relative rotation therebetween, second drive means independent of said first drive means for rotating said shifting member relative to said arbor, and means for disconnecting said first drive means from said shifting member and connecting said second drive means to said shifting member.

5. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for moving said arbor axially upon relative rotation between said arbor and said shifting member, second drive means independent of said first drive means for rotating said member relative to said arbor, and means for connecting said second drive means to said shifting member to produce a predetermined axial movement of said arbor.

6. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for moving said arbor axially upon relative rotation between said arbor and said shifting member, second drive means independent of said first drive means for rotating said member relative to said arbor, and means for connecting said second drive means to said shifting member to produce a predetermined axial movement of said arbor, and means responsive to said predetermined axial movement of said arbor for disconnecting said second drive means from said shifting member.

7. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, means for connecting said first drive means to said shifting member to produce relative rotation therebetween, second drive means independent of said first drive means for rotating said shifting member relative to said arbor, means for disconnecting said first drive means from said shifting member and connecting said second drive means to said shifting member, and means responsive to predetermined rotation of said shifting member relative to said arbor for disconnecting said second drive means from said shifting member and connecting said first drive means to said shifting member.

8. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, means for connecting said first drive means to said shifting member to produce relative rotation therebetween, second drive means independent of said first drive means for rotating said shifting member relative to said arbor, means for disconnecting said first drive means for said shifting member and connecting said second drive means to said shifting member, and axial shift predetermining means connectable to said shifting member for rotation therewith, and means responsive to predetermined rotation of said predetermining means for disconnecting said second drive means from said shifting member and connecting said first drive means thereto.

9. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, means for connecting said first drive means to said shifting member to produce relative rotation therebetween, second drive means independent of said first drive means for rotating said shifting member relative to said arbor, and means for disconnecting said first drive means from said shifting member and connecting said second drive means to said shifting member.

10. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, means for connecting said first drive means to said shifting member to produce rotation thereof, second drive means independent of said first drive means for rotating said shifting member relative to said arbor, and means for disconnecting said first drive means from said shifting member and connecting said second drive means to said shifting member.

11. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, disconnectable gear means for connecting said first drive means to said shifting member to produce relative rotation therebetween, second drive means independent of said first drive means for rotating said shifting member relative to said arbor, and means for disconnecting said gear means and connecting said second drive means to said shifting member.

12. In a hob head including a housing, a hob arbor rotatively mounted in the housing and arranged for axial movement therein, arbor drive means for rotating the arbor, a shifting member rotatively supported in the housing and means connecting the arbor and the shifting member to produce axial movement of the arbor upon relative rotation between the arbor and the shifting member, the improvement comprising, means for connecting the arbor drive means to said shifting means, shifting drive means connectable to the shifting member to produce relative rotation between the shifting member and the arbor, and means for disconnecting said means for connecting from said shifting member and connecting said shifting drive means thereto.

13. In a hob head including a housing, a hob arbor rotatively mounted in the housing and arranged for axial movement therein, arbor drive means for rotating the arbor, a shifting member rotatively supported in the housing and means connecting the arbor and the shifting member to produce axial movement of the arbor upon relative rotation between the arbor and the shifting member, the improvement comprising, means for connecting the arbor drive means to said shifting means to provide relative rotation therebetween, shifting drive means connectable to the shifting member to produce relative rotation between the shifting member and the arbor, and means for disconnecting said first means from said shifting member and connecting said shifting drive means thereto.

14. In a hob head including a housing, a hob arbor rotatively mounted in the housing and arranged for axial movement therein, arbor drive means for rotating the arbor, a shifting member rotatively supported in the housing and means connecting the arbor and the shifting member to produce axial movement of the arbor upon relative rotation between the arbor and the shifting member, the improvement comprising, means for connecting the arbor drive means to said shifting means to provide relative rotation therebetween, shifting drive means connectable to the shifting member to produce relative rotation between the shifting member and the arbor, and means for disconnecting said means for connecting from said shifting member and connecting said shifting drive means thereto.

15. A hob head comprising a housing, a hob arbor rotatably mounted and axially movable within said housing, first and second threaded parts, one fixed to and rotatable with said arbor, a first gear connected to rotatably drive said arbor, a second gear connected to the other of said threaded parts, first drive means for rotating said first gear and driving said arbor, second drive means connected to said second gear and arranged to drive said other threaded part and produce relative rotation between said threaded parts, a gear train connectable between said first and second gears, and means for disconnecting said second drive means from said second gear and connecting said gear train between said first and second gears.

16. A hob head comprising a housing, a hob arbor rotatably mounted and axially movable within said housing, a screw shaft fixed to and rotatable with said arbor, a rotatable nut threadably engaging said screw shaft and held against axial movement, a first gear connected to rotatably drive said arbor, a second gear connected to said nut, first drive means for rotating said first gear and driving said arbor, second drive means disposed about and connected to said nut arranged to rotate said nut relative to said arbor and axially move said screw shaft, a gear train drivable by said first gear and connectable to said second gear, and means for disconnecting said second drive means from said second gear and connecting said gear train to said second gear.

17. The hob head of claim 16 where said gear train drives said second gear and nut at the speed of said arbor.

18. The hob head of claim 16 where said gear train drives said second gear and nut at a greater speed of rotation than said arbor.

19. A hob head comprising, a housing, a hob arbor rotatably mounted in said housing and axially movable therein, driving means for rotating said arbor, sleeve means rotatably supported coaxial with said arbor, a first gear disposed about said sleeve rotatable with said arbor, a second gear on said sleeve rotatable therewith, first and second pinions rotatably supported in said housing in meshing engagement with said first and second gears, respectively, said pinions being axially clutchable together such that said first gear drives said second gear through said pinions, a member having a threaded bore therethrough coaxially connected to and rotatable with said sleeve, a screw shaft connected to said arbor for rotation therewith and threadably received within said bore, the ratio of said gears and pinions being so chosen that when said pinions are clutched relative rotation exists between said shaft and said member and linear motion is imparted to said shaft and said arbor.

20. A hob head comprising a housing, a hob arbor rotatably mounted in said housing and axially movable therein, driving means for rotating said arbor, sleeve means rotatably supported coaxial with said arbor, a first gear disposed about said sleeve rotatable with said arbor, a second gear on said sleeve rotatable therewith, first and second pinions rotatably supported in said housing in meshing engagement with said first and second gears, respectively, said pinions being axially clutchable together such that said first gear drives said second gear through said pinions, a member having a threaded bore therethrough coaxially connected to and rotatable with said sleeve, a screw shaft connected to said arbor for rotation therewith and threadably received within said bore, the ratio of said gears and pinions being so chosen that when said pinions are clutched relative rotation exists between said shaft and said member, means for declutching said pinions, and separate drive means for driving said second gear when said pinions are declutched to produce relative rotation between said member and said shaft.

21. A hob head comprising a housing, a hob arbor rotatably mounted in said housing and axially movable therein, driving means for rotating said arbor, sleeve means rotatably supported coaxial with said arbor, a first gear disposed about said sleeve and rotatable with said arbor, a second gear on said sleeve rotatable therewith, first and second pinions rotatably supported in said housing in meshing engagement with said first and second gears, respectively, said pinions being axially clutchable together such that said first gear drives said second gear through said pinions, a shifting member having a threaded bore therethrough connected to and rotatable with said sleeve, a screw shaft connected to said arbor for rotation therewith and threadably received within said bore, means for declutching said pinions, and second drive means for driving said second gear to produce relative rotation between said shifting member and said shaft.

22. The hob head of claim 21 further including first and second clutch members, said first clutch member being rotatable with said shifting member, means for clutching said first and second clutch members, means responsive to predetermined rotation of said second clutch member for disconnecting said second drive means and clutching said pinions.

23. The hob head of claim 22 further including means for simultaneously clutching said pinions and disconnecting said second drive means from said second gear.

24. The hob head of claim 22 further including means for resetting said second clutch member.

25. The hob head of claim 22 including means for periodically clutching said clutch members and means responsive thereto for declutching said pinions and connecting said second drive means to said second gear.

26. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, second drive means connectable to said shifting means for rotating said shifting member relative to said arbor, first and second clutch members, said first clutch member being rotatable with said shifting member, means for clutching said first and second clutch members, and means responsive to predetermined rotation of said second clutch member for disconnecting said second drive means from said shifting member.

27. A hob head comprising a housing, a hob arbor, means mounting said arbor in said housing for rotation and axial movement therein, first drive means for rotating said arbor, an arbor shifting member rotatively supported in said housing in fixed axial position, means connecting said arbor and said shifting member for shifting said arbor axially upon relative rotation between said arbor and said shifting member, second drive means connectable to said shifting means for rotating said shifting member relative to said arbor, first and second clutch members, said first clutch member being rotatable with said shifting member, means for clutching said first and second clutch members, means responsive to predetermined rotation of said second clutch member for disconnecting said second drive means from said shifting member, means for resetting said second clutch member, and means for periodically connecting said second drive member to said shifting member and actuating said clutch members.

References Cited
UNITED STATES PATENTS

| | | | |
|---|---|---|---|
| 2,537,967 | 1/1951 | Carlin | 90—4 |
| 2,629,290 | 2/1953 | Staples et al. | 90—4 |
| 2,700,324 | 1/1955 | Staples et al. | 90—4 |
| 3,167,999 | 2/1965 | Montean | 90—4 |

WILLIAM W. DYER, JR., *Primary Examiner.*

GERALD A. DOST, *Examiner.*